United States Patent
Morinaga et al.

(10) Patent No.: US 7,706,279 B2
(45) Date of Patent: Apr. 27, 2010

(54) COMMUNICATION PERFORMANCE MEASUREMENT METHOD

(75) Inventors: Masanobu Morinaga, Kawasaki (JP);
Noriyuki Fukuyama, Kawasaki (JP);
Hideaki Miyazaki, Kawasaki (JP);
Sumiyo Okada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 281 days.

(21) Appl. No.: 11/900,544

(22) Filed: Sep. 12, 2007

(65) Prior Publication Data

US 2008/0159148 A1  Jul. 3, 2008

(30) Foreign Application Priority Data

Dec. 27, 2006  (JP) .............. 2006-352827

(51) Int. Cl.
*H04L 12/26* (2006.01)
(52) U.S. Cl. .................. 370/236.1; 370/252; 370/401
(58) Field of Classification Search ............ 370/236, 370/241, 242, 243, 244, 248, 249, 252, 236.1, 370/253, 389, 392, 401
See application file for complete search history.

(56) References Cited

U.S. PATENT DOCUMENTS

2006/0072474 A1* 4/2006 Mitchell ................ 370/252
2007/0115840 A1* 5/2007 Feick et al. ............. 370/252
2008/0019283 A1* 1/2008 Emile .................... 370/252
2008/0101253 A1* 5/2008 Shvodian ............... 370/252

FOREIGN PATENT DOCUMENTS

JP 2006-013 1/2006

* cited by examiner

*Primary Examiner*—Brian D Nguyen
(74) *Attorney, Agent, or Firm*—Greer, Burns & Crain, Ltd.

(57) ABSTRACT

The present invention includes a designating packet transferring step, a measurement packet transmitting step and a measurement packet collecting step. The designating packet transferring step is a step of transferring a designating packet in a target section for a communication performance measurement in the communication network, the designating packet designating a relaying apparatus which adds information to the measurement packet from among plural relaying apparatuses. The measurement packet transmitting step is a step of transmitting a measurement packet from one end of the target section. The measurement packet collecting step is a step of collecting the measurement packet transferred in the target section from among measurement packets which are transmitted in the measurement packet transmitting step.

5 Claims, 7 Drawing Sheets

COMMUNICATION PERFORMANCE MEASUREMENT METHOD

BACKGROUND OF THE INVENTION

1. Field of the Invention

The present invention relates to a communication performance measurement method for measuring communication performance in a communication network including relaying apparatuses each of which relaying apparatuses a packet representing information.

2. Description of the Related Art

In recent years, so-called real-time application such as VoIP (Voice over Internet Protocol) and video streaming that send and receive audio and image data between devices connected to a packet communication network including routers (relaying apparatuses) that relay a packet has been increasingly used. In such a real-time application, conditions of communication in a packet communication network determine replay quality of audio and image data that is received on the application.

Accordingly, in order to realize an operational environment suitable for such a real-time application on a packet communication network, it is required to maintain communication performance previously required for the packet communication network. In some cases, communication performance of the packet communication network needs to be measured.

As a method for measuring communication performance of a packet communication network, a measurement method for measuring the communication performance by sending and receiving measurement packets between a transmitting terminal connected to one end of a target section for the communication performance measurement and a receiving terminal connected to the other end of the target section, writing identifying information that a router, which intervenes between the terminals for relaying the measurement packets, identifies itself from the other routers on the packet communication network and information according to the relaying such as a time of relaying in each of the measurement packets during the period of sending and receiving, collecting the measurement packets and analyzing the written information is proposed (see Japanese Patent Laid-Open No. 2006-13969).

In the method proposed, however, has a security problem, as information identifying a router on a packet communication network such as an IP address of the router is written in a packet so that a third party may steal a glance at the measurement packet for getting a configuration of the packet communication network. In such a packet communication network that may have a multi-vendor configuration, the amount of information for applicants forming the communication network and information on management is increasing, significantly complicating operating and managing tasks such as monitoring the quality of the packet communication network.

The present invention is adapted in view of the circumstances and provides a communication performance measurement method providing high security and facilitates operation and management such as monitoring of quality.

SUMMARY OF THE INVENTION

The present invention has been made in view of the circumstances and provides a communication performance measurement method of measuring communication performance in a communication network including a plurality of relaying apparatuses each relaying a packet representing information, wherein when the relaying apparatus relays a predetermined measurement packet, the relaying apparatus adds information according to each relaying in the relaying apparatus to the predetermined measurement packet to relay the predetermined measurement packet with the information, and wherein the communication performance measurement method comprises:

a designating packet transferring step of transferring a designating packet in a measurement target section for which a communication performance is measured in the communication network, the designating packet designating a relaying apparatus which adds information to the measurement packet from among the plurality of relaying apparatuses;

a measurement packet transmitting step of transmitting a measurement packet from one end of the measurement target section; and a measurement packet collecting step of collecting the measurement packet transferred in the measurement target section from among the measurement packets transmitted in the measurement packet transmitting step.

With the communication performance measurement method of the present invention, a specifying packet in which information for identifying a relaying apparatus on a communication network is written is communicated in the section to be measured for only once. The communication performance measurement method of the present invention can improve security by lowering probability that a third party steals a glance at information for identifying a relaying apparatus on a communication network. As a time for starting measurement is so clear that sequential information can be obtained.

In the communication performance measurement method of the present invention, it is preferable that the relaying apparatus adds in advance designated type of information to the measurement packet to relay the measurement packet having the previously designated type of information, and the designating packet transferring step is a step of designating a relaying apparatus, and of transferring a designating packet in the measurement target section, the designating packet designating a type of information the designated relaying apparatus adds.

In such a manner, measurement according to the conditions can be implemented.

Here, in the communication performance method according to the present invention, it is preferable that when the relaying apparatus relays a predetermined identification information written packet, the relaying apparatus adds identification information that identifies the relaying apparatus from the other relaying apparatuses to relay the identification information written packet with the identification information, wherein the communication performance measurement method comprises an identification information written packet communication step that collects the identification information written packet that is transferred in the measurement target section, and the designating packet transferring step is a step of transferring a designating packet in the measurement target section, designating packet designating a relaying apparatus that is identified by the identification information written in the identification information written packet collected in the identification information written packet communication step, or that when the relaying apparatus relays a predetermined type information written packet, the relaying apparatus adds information representing a type of the relaying apparatus to the type information written packet to relay the type information written packet having the type information, wherein the communication performance measurement method includes a type information written packet communication step of collecting the type information written packet transferred in the measurement target section, and the designating packet transferring step is a step of transferring a designating packet in the measurement target section, the designating packet that designates a relaying apparatus having a type indicated by the type information written in the type information written packet collected in the type information written packet communication step, or that when the relaying apparatus relays a predetermined dummy packet in which a integer is written in advance, the relaying apparatus rewrites an integer written in a predetermined dummy packet into a integer that is 1 subtracted from the integer, if the rewritten integer becomes 0, the relaying apparatus returns a return packet to an origin of the dummy packet, the return packet in which an identification information is written, the identification information identifying the relaying apparatus from the other relaying apparatuses, and wherein the communication performance measurement method comprises a returning packet collecting step that, in the measurement target section, transmits in order a plurality of dummy packets in each of which one of a plurality of integers is written, and collects the returning packet, the plurality of integers being different from each other, and the designating packet transferring step is a step of transferring a designating packet in the measurement target section, the designating packet designating a relaying apparatus that is identified by identification information written in the return packet collected in the return packet collecting step.

If a relaying apparatus is adapted such that information on the relaying apparatus is written in the packet with type information written, the packet with identifying information written, or the returning packet as mentioned above, the relaying apparatus can be specified without previous knowledge of information on the relaying apparatus included in the section to be measured and the measurement method can be automatically implemented.

According to the present invention, a communication method with high security can be provided. The present invention also facilitates operation and management such as monitoring the quality that tends to be complicated.

BRIEF DESCRIPTION OF THE DRAWINGS

Preferred embodiments of the present invention will be described in detail with reference to the following drawings.

DETAILED DESCRIPTION OF THE INVENTION

Exemplary embodiments of the present invention will be described below.

Figure 1:
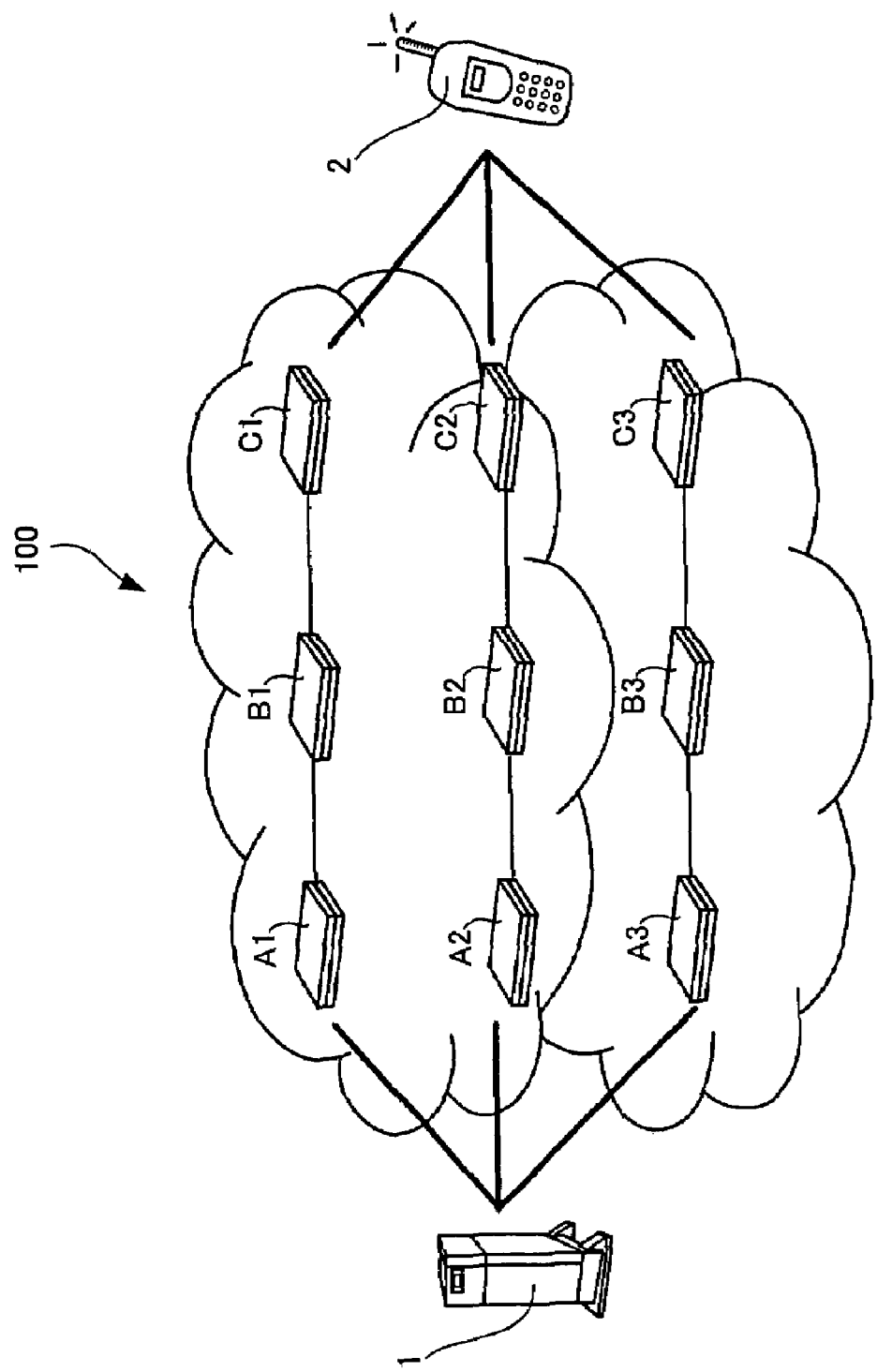
FIG. 1 is a schematic diagram of a packet communication network in which a first embodiment of the communication performance measurement method of the present invention is implemented.

FIG. 1 is a schematic diagram of a packet communication network in which a first embodiment of the communication performance measurement method of the present invention is implemented. The packet communication network used in the embodiment of the present invention is the same communication network as a conventional packet communication network.

FIG. 1 shows a state in which a measurement server and 1 and a measurement terminal 2 are connected to the packet communication network 100, the measurement server 1 transmits a packet used in the communication performance measurement method of the first embodiment and the measurement terminal 2 receives the packet.

FIG. 1 shows a state in which routers A1, A2, A3, B1, B2, B3, C1, C2 and C3 which are capable of relaying a packet between the measurement server 1 and the measurement terminal 2 both connected to the packet communication network 100, are arranged in the packet communication network 100.

Terminals and the like (not shown) are connected to each of the routers A1, A2, A3, B1, B2, B3, C1, C2 and C3. An IP (Internet Protocol) address identification information is given to each of the routers and the terminals that are belonging to each of the routers as identifying information in the packet communication network 100.

A packet is transferred in the packet communication network 100 based on the IP address of the source and the IP address of the destination that are written in a header of the packet. In order to avoid complication of showing drawings, a typical case in which communication performance of a section including the three routers A1, B1 and C1 shown in the top of FIG. 1 is measured using the measurement server 1 and the measurement terminal 2 will be exemplified for a description.

Figure 2:
FIG. 2 is a diagram showing a format of a packet used in the communication performance measurement method of the embodiment.

FIG. 2 is a diagram showing a format of a packet used in the communication performance measurement method of the embodiment.

FIG. 2 shows a format of a RTP (Real-time Transport Protocol) packet complying with RTP used in the communication performance measurement method of the embodiment. The RTP packet includes, from the top, an IP header, an UDP header, a RTP header and DATA. The IP (Internet Protocol) header has the same configuration as an 'IP Header' added to a packet by IP complying with a layer called the network layer of the OSI reference model. The UDP (User Datagram Protocol) header has the same configuration as the 'UDP header' that is added to a packet by UDP complying with a layer called the transport layer which is a higher layer than the network layer of the OSI model. In addition, the RTP header is a header added by RTP, which is a higher protocol than 'UDP'. The data unique to the first embodiment is written in the DATA. The format of the RTP packet, for example, is used when a pre-marker packet or a test packet is sent in a condition similar to a communication state of VoIP to measure characteristics of a communication network unique to VoIP. If the format of the RTP packet is not to be similar to a communication state of VoIP, the format of the RTP packet is not necessarily complied with RTP packet format and a unique format may be used.

Figure 3:
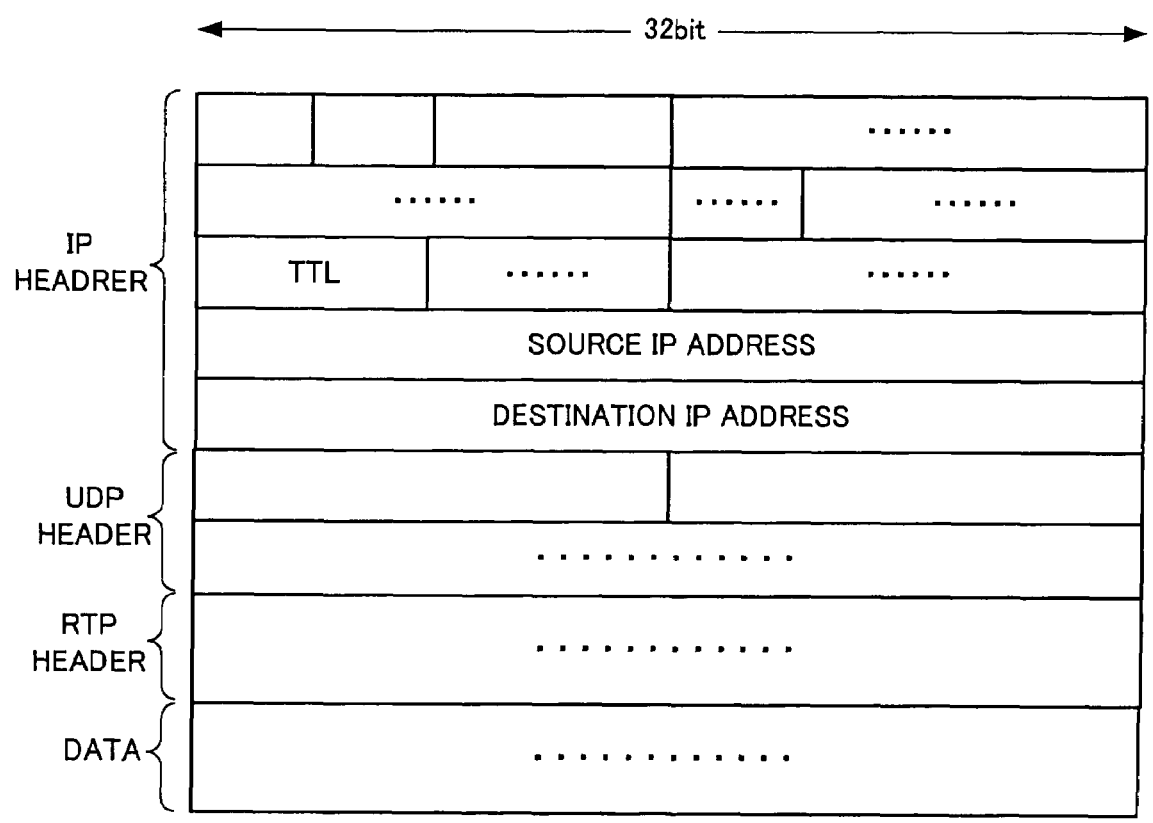
FIG. 3 is a diagram showing the contents of a packet used in the communication performance measurement method of the embodiment.

FIG. 3 is a diagram showing the contents of a packet used in the communication performance measurement method of the embodiment.

The 'IP header' shown in FIG. 3 includes 'TTL (Time To Live)', 'source IP address', 'destination IP address' which are to be described later. As configurations and the contents of the 'UDP header', 'RTP header', and configuration of 'DATA' do not directly relate to the communication performance measurement method of the embodiment, they are omitted from the description.

Figure 4:
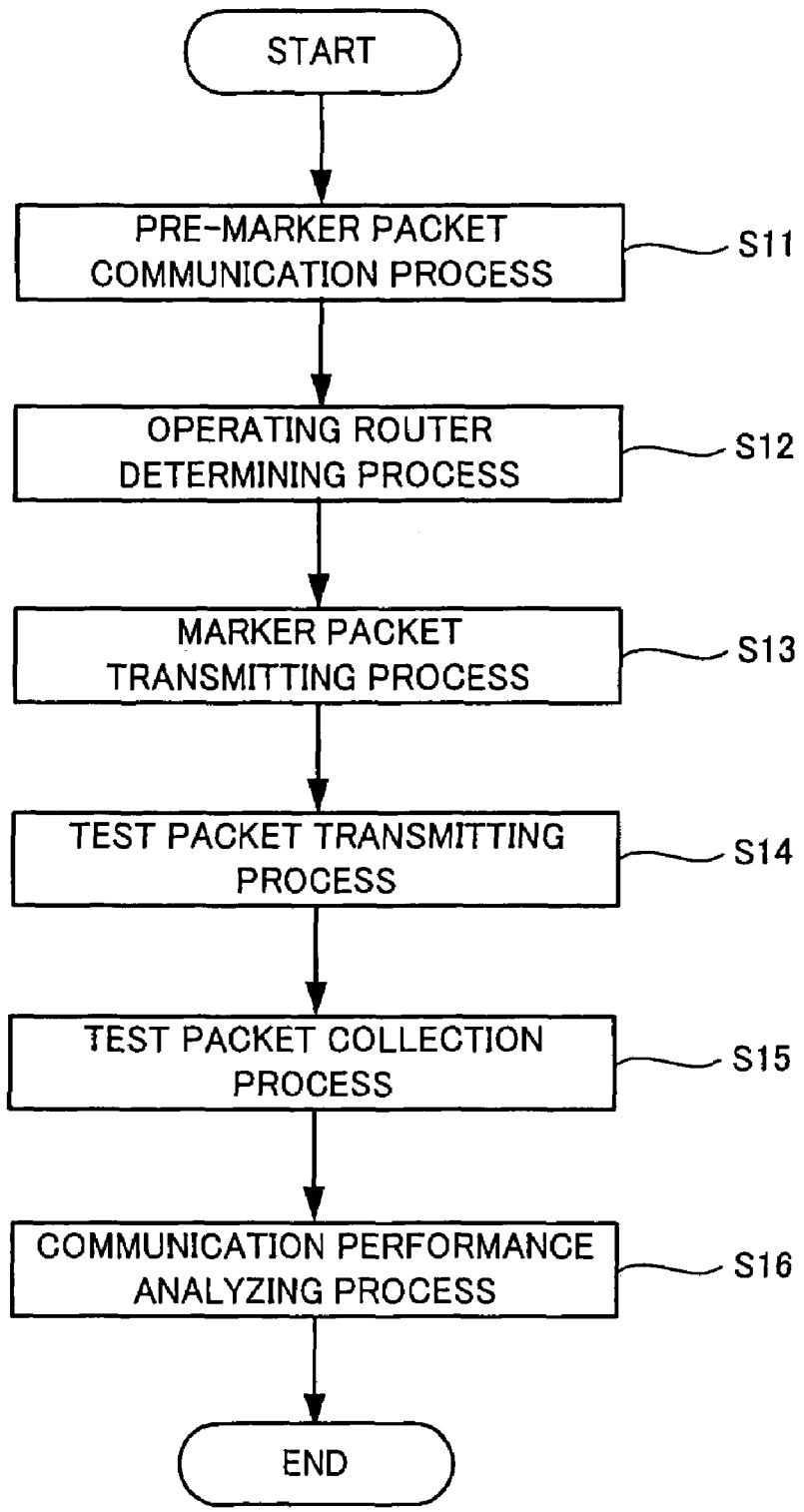
FIG. 4 is a diagram showing a flow of the communication performance measurement method of the embodiment.

FIG. 4 is a diagram showing a flow of the communication performance measurement method of the embodiment.

In the communication performance measurement method of the embodiment, at a pre-marker packet communication step S11, the measurement server 1 sends and receives a pre-marker packet via the measurement terminal 2 described above for obtaining an IP address for identifying a router existing in a target section for the communication performance measurement, and in an operation router determining step S12, the measurement server 1 determines a router that is to provide information according to relaying from the routers whose IP addresses are obtained in the pre-marker packet communication step S11. Then, in a marker packet transmitting step S13, a marker packet designating the router determined in the operation router determining step S12 to provide the information described above is transmitted from the measurement server 1 to the measurement terminal 2. Next, in a test packet transmitting step S14, the router designated to provide the information in the marker packet transmitting step S13 writes the information in test packets that are repeatedly transmitted from the measurement server 1 to the measurement terminal 2 for the number of times required for measurement. Then, in a test packet collecting step S15, the test packets in which the information is written are collected, and in a communication performance analyzing step S16, information written in the collected test packets are analyzed for measuring the communication performance in the measurement target section.

An outline of the communication performance measurement method of the embodiment has been described. Now, the details of each step will be described.

Figure 5:
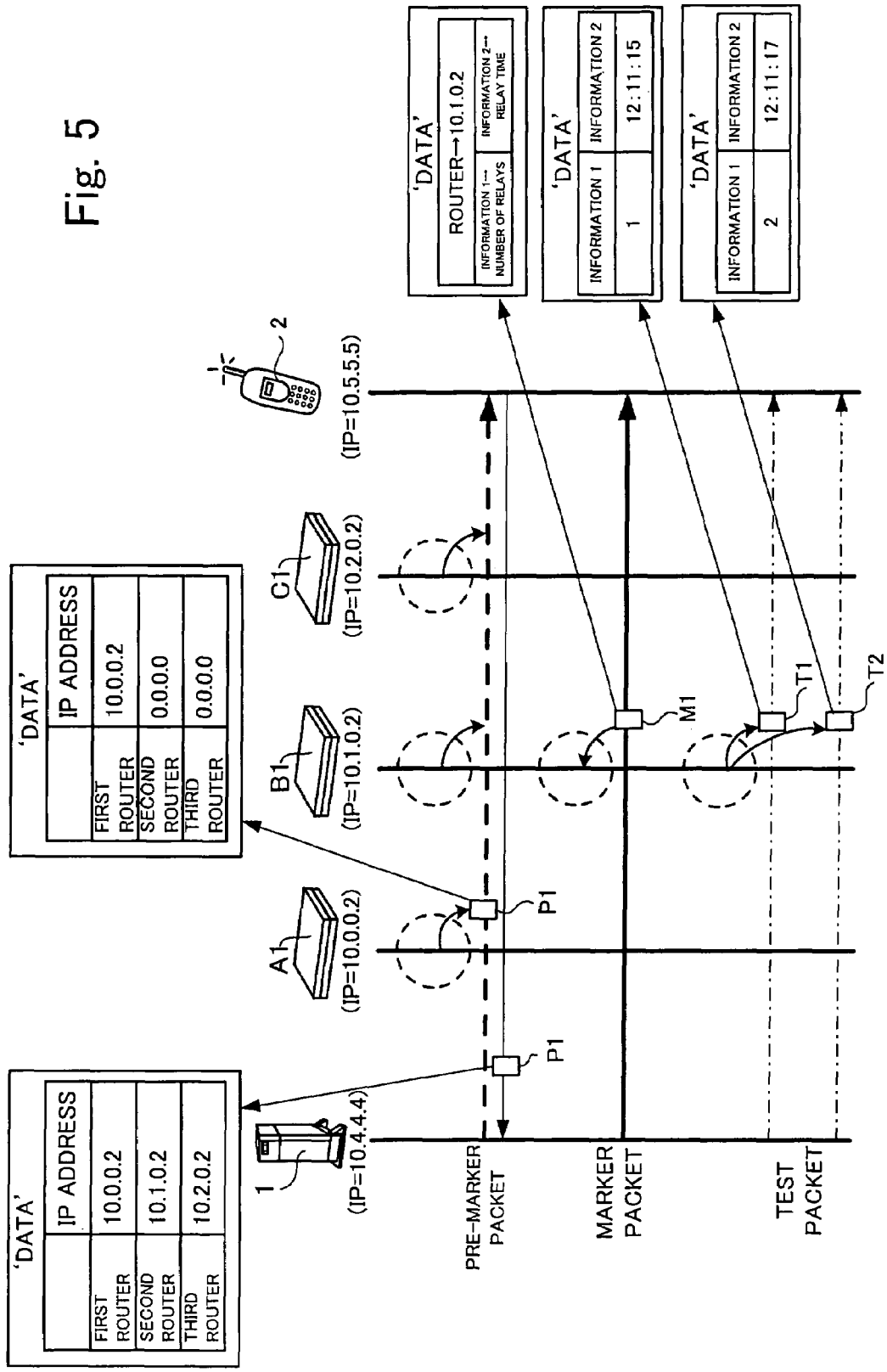
FIG. 5 is a schematic diagram of a first embodiment of the communication performance measurement method of the present invention.

FIG. 5 is a schematic diagram of the first embodiment of the communication performance measurement method of the present invention.

FIG. 5 shows the routers A1, B1 and C1 included in the target section for the communication performance measurement by the communication performance measurement method of the embodiment, the measurement server 1 and the measurement terminal 2 that are used in the method.

In the communication performance method, a pre-marker packet P1 whose configuration is shown in FIGS. 2 and 3, which pre-marker packet is for obtaining an IP address of a router of the section to be measured is transmitted from the measurement server 1, which is one end of the measurement target section, to the measurement terminal 2, which is the other end with respect to the one end. The transmission is shown by dotted lines in FIG. 5.

In addition, FIG. 5 shows a state in which the pre-marker packet P1 transmitted from the measurement server 1 is on the way between the router A1 and the router B1. Each of the routers A1, B1 and C1 is set as to write each own IP address in the pre-marker packet P1 when each of the routers relays the packet. Therefore, each of the routers A1, B1 and C1 writes each own IP address in the pre-marker packet P1 when each of the routers relays the packet. Such a technique that a router writes its IP address in a pre-marker packet P1 when it relays the packet has been conventionally known. In addition, as described above, an IP address on a packet communication network is previously set in each of the routers A1, B1 and C1, and the measurement server 1 and the measurement terminal 2, the IP address '10.0.0.2" is set in the router A1, the IP address '10.1.0.2' is set in the router B1, and the IP address '10.2.0.2' is set in the router C1, and the IP address '10.4.4.4' is set in the measurement server 1 and the IP address '10.5.5.5' is set in the measurement terminal 2. When the pre-marker packet is sent from the measurement server 1 to the measurement terminal 2, '10.4.4.4' is written in the 'source IP address' of the 'IP header' and '10.5.5.5' is written in the 'destination IP address' of the 'IP header' as shown in FIG. 3.

FIG. 5 schematically shows the contents of the pre-marker packet P1 on the way between the router A1 and the router B1, which contents are written in 'DATA' shown in FIGS. 2 and 3. As the pre-marker packet P1 has been relayed by the router A1, the IP address '10.0.0.2' corresponding to the 'first router' is written in the 'DATA' of the pre-marker packet P1. As the pre-marker packet has not been relayed by the routers B1 and C1, the IP addresses corresponding to the 'second router' and the 'third router' of the 'DATA' have not been written.

In FIG. 5, the pre-marker packet P1 is shown by thin lines in a state in which the pre-marker packet P1 that has been relayed through the routers A1, B1 and C1 and received by the measurement terminal 2 is then sent to the measurement server 1. In FIG. 5, the contents written in the 'DATA' of the pre-marker packet P1 returned from the measurement terminal 2 are schematically shown. As the pre-marker packet P1 has been relayed through the routers A1, B1 and C1, the IP addresses '10.1.0.2' and '10.2.0.2' of the routers B1 and C1 are written corresponding to the 'second router' and the 'third router'.

When the measurement server 1 collects the pre-marker packet P1 that is transmitted from the measurement server 1 and returned through the measurement terminal 2, the measurement server 1 determines the router B1 among the three routers A1, B1 and C1 that are confirmed of their presence as a router to provide information according to the relaying so as to measure the communication performances both between the router B1 that is present at the middle of the measurement target section and the measurement server 1 and between the router B1 and the measurement terminal 2; and writes the IP address of the router B1 in a marker packet M1. The measurement server 1 may determine all of the three routers A1, B1 and C1 as routers to provide information according to the relaying so as to measure the measurement target section for further detail.

FIG. 5 shows a state in which the marker packet M1 is transmitted from the measurement server 1 to the measurement terminal 2 by a heavy line.

FIG. 5 also schematically shows the contents of the marker packet M1, in which the IP address '10.1.0.2' of the router B1 is written as the IP address of a router to provide information according to the relaying. As information for the router B1 whose IP address is '10.1.0.2' to provide, 'the number of relaying' and 'the time of relaying' are written.

If the IP address of each of the routers A1, B1 and C1 is written in the marker packet that is relayed by each of the routers, information about the type written in the marker packet is written in a test packet each time the router relays the test packet thereafter.

FIG. 5 shows a state in which the test packets T1 and T2 in which 'the number of relaying' and 'the time of relaying' are written by the router B1 whose IP address is written in the marker packet M1 are transmitted from the measurement server 1 and the measurement terminal 2 by dashed lines. FIG. 5 also schematically shows the contents of the test packets T1 and T2. As the test packet T1 has been relayed by the router B1, '1' representing the number of relaying of the test packet by the router B1 after the relaying of the marker packet M1 is written as 'information 1' and '12:11:15' representing the time of relaying indicating when the router B1 relayed the test packet T1 is written as 'information 2' in the test packet T1. In the test packet T2, '2' representing the number of relaying of the test packet by the router B1 after the relaying of the marker packet M1 is written as 'information 1' and '12:11:17' indicating the time of relaying representing when the router B1 relayed the test packet T1 is written as 'information 2'.

The measurement terminal 2 evaluates the communication performance of the measurement target section by collecting the test packets T1 and T2 and statistically analyzing the contents written in the test packets T1 and T2. The measurement server 1 may statistically analyze and evaluate the communication performance of the measurement target section by sending the test packet back from the measurement terminal 2 to the measurement server 1.

As described above, although the IP address for identifying a router on the packet communication network is written in the marker packets P1 and M1 in the communication performance measurement method of the embodiment, it is possible to reduce probability that someone steals a glance at a packet in which the IP address is written, as compared to the case in which the IP address is written with the number of relaying and the time of relaying for each test packet used in measuring the communication performance. Therefore, the communication performance measurement method of the embodiment can improve security. According to the communication performance measurement method of the embodiment, a relaying apparatus included in a measurement target section can be specified even if identification information of the relaying apparatus is unknown, which can contribute automatic implementation of the measurement method. The pre-marker packet of the embodiment corresponds to an example of the identification information written packet of the present invention, the maker packet of the embodiment corresponds to an example of the designating packet in the present invention, and the test packet of the embodiment corresponds to an example of the measurement packet in the present invention. The IP address of the embodiment corresponds to an example of the identifying information in the present invention.

Now, the second embodiment of the communication performance measurement method of the present invention will be described.

In the first embodiment described above, a router that relayed the pre-marker packet P1 is caused to write the router's IP address in the packet. In the second embodiment, a router that relayed the pre-marker packet P1 is caused to write a router type thereof in the packet. As the flow of the communication performance measurement method of the embodiment is the same as that shown in FIG. 4, it is omitted in the drawing.

Figure 6:
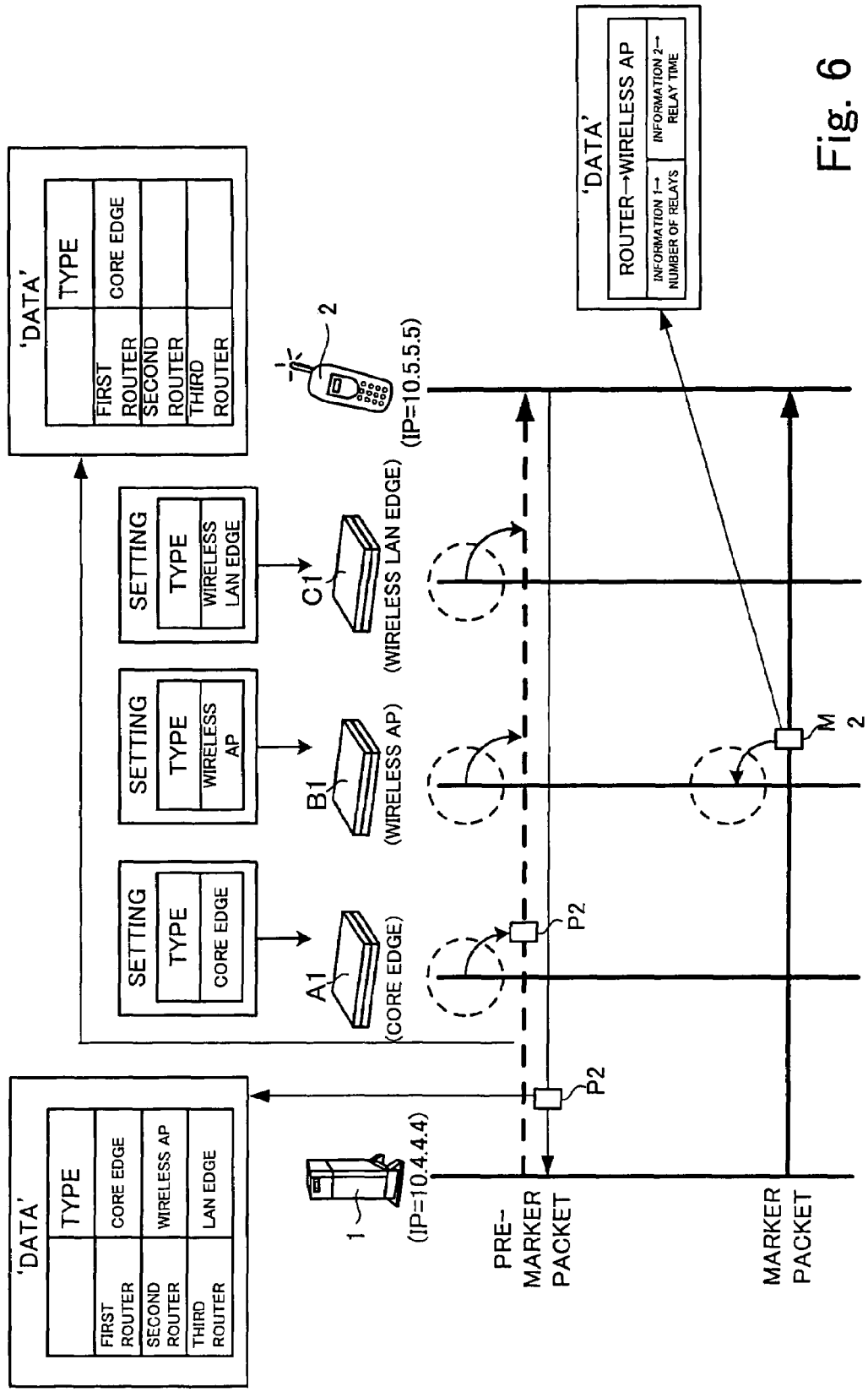
FIG. 6 is a schematic diagram of a second embodiment of the communication performance measurement method of the present invention.

FIG. 6 is a schematic diagram of the second embodiment of the communication performance measurement method of the present invention.

FIG. 6 shows a state in which the types 'core edge', 'wireless AP', 'LAN edge' are previously set to each of the routers A1, B1 and C1 instead of the IP address.

FIG. 6 also shows a state in which the type of each router is written in the pre-marker packet 2. The pre-marker packet of the embodiment corresponds to an example of the type information written packet in the present invention.

When the measurement server 1 collects the pre-marker packet P2 that is transmitted from the measurement server 1 and returned through the measurement terminal 2, it determines the router B1 among the three routers A1, B1 and C1 that are confirmed of their presence as a router to provide information according to the relaying so as to measure the communication performances both between the router B1 that is present at the middle of the section to be measured and the measurement server 1 and between the router B1 and the measurement terminal 2; and writes the 'wireless AP' which is the type of the router B1 in a marker packet M2.

FIG. 6 shows a state in which the marker packet M2, in which 'wireless AP' that is the type of the router B1 to provide 'the number of relaying' and 'the time of relaying' is written, is transmitted from the measurement server 1 to the measurement terminal 2 by a heavy line. The router B1 designated by the marker packet M2 writes the number of relaying and the time of relaying for each test packet that relays thereafter.

In the second embodiment, although the type of router on the packet communication network is also written in the pre-marker packet 2 and the marker packet M2, it is possible to lower probability that the relaying apparatus is identified when the packet is stolen a glance at, as compared to the case in which the IP address is written with the number of relaying and the time of relaying for each test packet used in measuring the communication performance. Therefore, according to the communication performance measurement method of the second embodiment, security can be improved. In addition, according to the second embodiment, because it is possible to designate a relaying apparatus without knowing information for identifying a relaying apparatus included in a measurement target section, it can contribute to automatic implementation of the measurement method.

Finally, a third embodiment of the communication performance measurement method of the present invention will be described.

The difference between the third embodiment and the first embodiment is as follows. In the first embodiment, a router included in a measurement target section writes identification information thereof in a pre-marker packet P1 that is sent and finally collected by the origin. On the other hand, in the third embodiment, a router included in a measurement target section writes identification information thereof in an error packet that is to be sent to the origin of a pre-marker packet.

Figure 7:
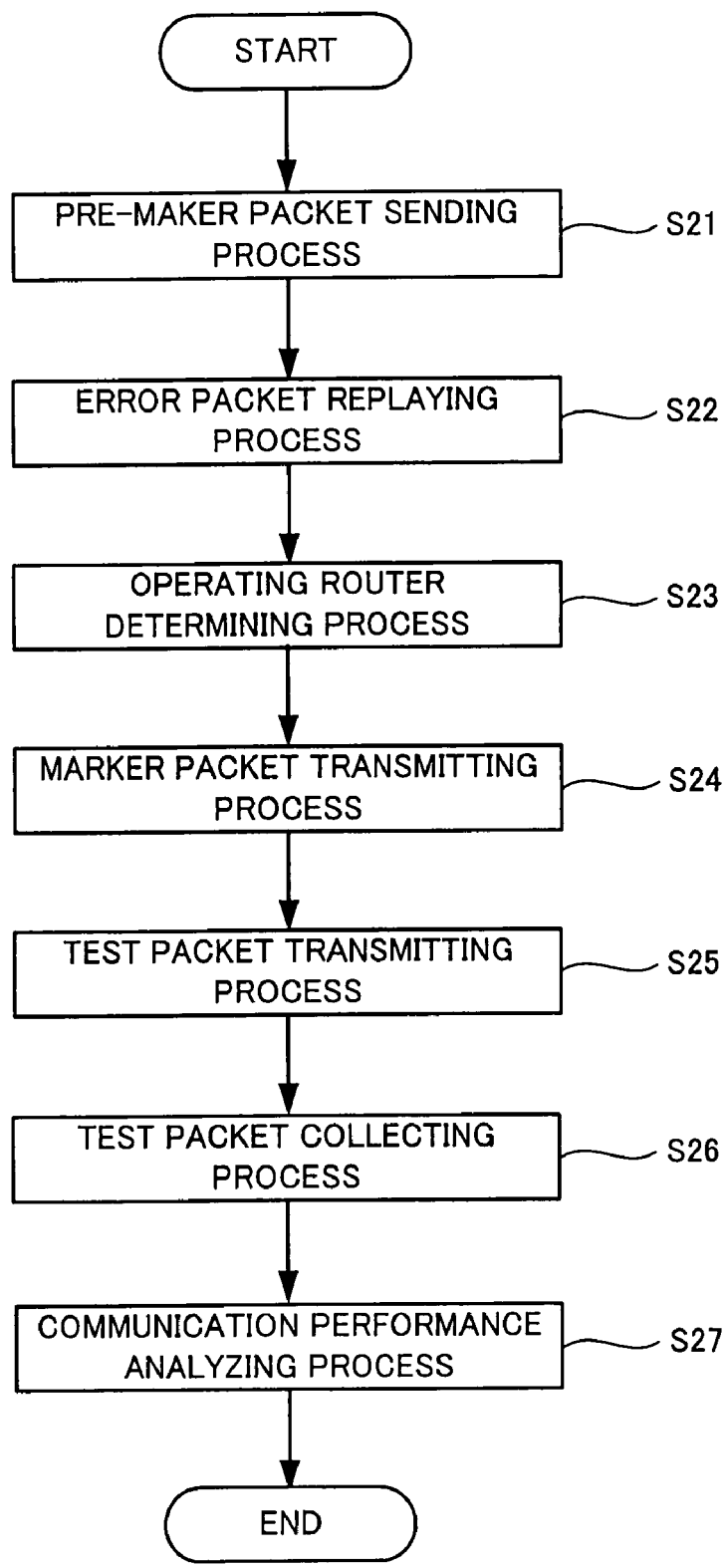
FIG. 7 is a diagram showing a flow of a third embodiment of the communication performance measurement method of the present invention.

FIG. 7 is a diagram showing a flow of the third embodiment of the communication performance measurement method of the embodiment.

In the communication performance measurement method of the embodiment, in a pre-marker packet sending step S21, pre-marker packets, in each of which one of integers which include a value larger than the number of relaying apparatuses that are supposed to be included in the measurement target section and are different from each other, are written, are sent from the measurement server 1 to the measurement terminal 2 to obtain the IP address for identifying a router that is present in the target section for the communication performance measurement, and each relaying apparatus rewrites the written integer to be replaced with a integer in which 1 is subtracted from the written integer, each time it relays a pre-marker packet. In the error packet returning step S22, if the integer included in a sent pre-marker packet becomes 0 when the pre-marker packet is relayed, the relaying apparatus returns an error packet with the written IP address thereof to the measurement server 1, which is the origin of the pre-marker packet. In the operation router determining step S23, from among routers those are confirmed of the presence by their IP addresses returned, a router to be caused to provide information according to relaying, is determined according to the same method as that in the first embodiment. As the subsequent steps after the marker packet transmitting step S24 are the same as those in FIG. 4, they are omitted from the description.

The communication performance measurement method of the embodiment has been roughly described. Now, each step will be detailed. In the following, a flow after collecting the IP addresses of the routers included in the measurement target section using an error pocket is the same as that in the first embodiment, it is omitted from the description.

Figure 8:
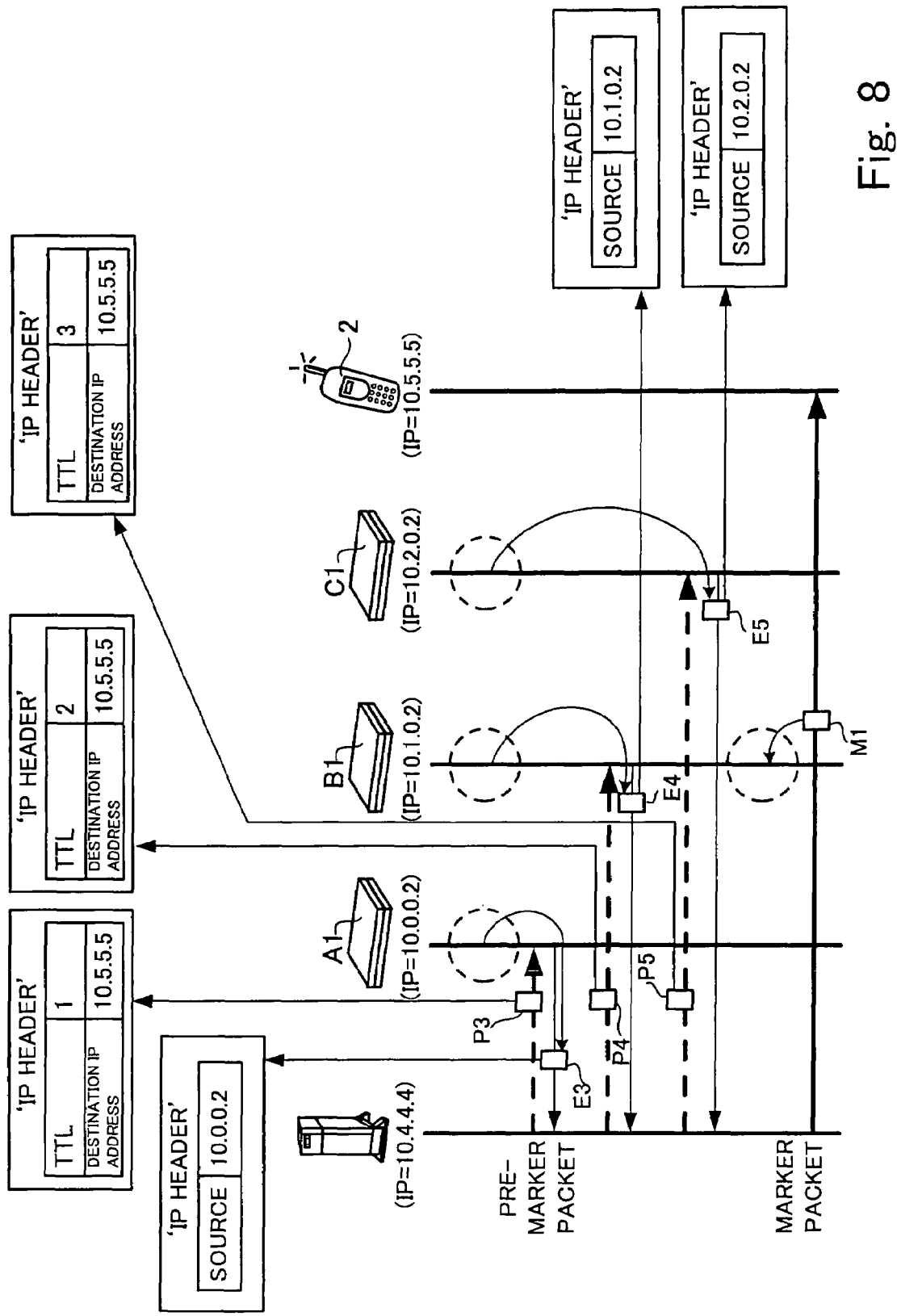
FIG. 8 is a schematic diagram of the third embodiment of the communication performance measurement method of the present invention.

FIG. 8 is a schematic diagram of the third embodiment of the communication performance measurement method of the present invention.

FIG. 8 shows a state in which error packets E3, E4 and E5 are returned from the routers A1, B1 and C1 to the measurement server 1 for pre-marker packets P3, P4 and P5 that are transmitted in order from the measurement server 1 to the measurement terminal 2, respectively, by dotted lines and thin lines respectively. The pre-marker packet of the embodiment corresponds to an example of the dummy packet of the present invention, and the error packet of the embodiment corresponds to an example of a returning packet of the present invention.

In addition, FIG. 8 schematically shows the contents of the pre-marker packets P3, P4 and P5, with the contents written in 'TTL (Time To Live)' and 'destination IP address' in the 'IP header' of the pre-maker packet. The embodiment adopts a conventional general method in that '10.5.5.5', which is the IP address of the measurement terminal 2, is written in the 'destination IP address' of the pre marker packet that is transmitted from the measurement server 1; integers that are different from each other (here, a integer starting from 1) are prewritten in the 'TTL' of the pre-marker packet, and each of the written integers is rewritten to be replaced with an integer in which 1 is subtracted from the written integer each time the pre-marker packet is relayed; and the relaying apparatus sends an error packet to the origin of a pre-marker packet when the integer becomes 0. In the embodiment, however, the IP address that is written as the origin in an error packet, which is returned to the measurement server 1 by the so-called 'TTL' function, is used for detecting a router included in a measurement target section. Here, in the 'TTL' function, a relaying apparatus sends an error packet to the origin of the pre-marker packet when the integer becomes 0. In the embodiment, it is assumed that the number of routers included in the measurement target section is unknown. Thus, actually, pre-marker packets in which values of the 'TTL' exceed '3' are also transmitted. In addition, here, although the integer starting from 1 is written in the 'TTL' of the pre-marker packet here, if the number of relaying included in the measurement target section is known, a integer which is about a half of the known number, may be written in order to cause a relaying apparatus located at the middle of relaying to provide information according to relaying.

FIG. 8 shows the contents written in the error packets E3, E4 and E5 that are returned from the routers A1, B1 and C1 to the measurement server 1, respectively. Although it is not shown, the IP address '10.4.4.4' of the measurement server 1 is written in the 'destination IP address' of the 'IP header' of each of the error packets E3, E4 and E5.

The pre-marker packet and the error packet will be further detailed below.

As described above, a value given in the 'TTL' of the 'IP header' of the pre-marker packet P3, which is a RTP packet defined according to RTP, is subtracted by 1 each time it is relayed by a router. The router that relays to make the value written in the 'TTL' 0 sends the error packet with the IP address of itself written to the measurement server 1, which is the origin of the pre-marker packet. As a result, the value '1' is given to the 'TTL' of the pre-marker packet that is first transmitted from the measurement server 1 to the measurement terminal 2, and the value of TTL of the pre-marker packet P3 becomes '0' in the relaying by the first router A1. Accordingly, the router A1 sends the error packet E3 in which the router writes its IP address '10.0.0.2' to the measurement server 1. That enables the measurement server 1 to obtain the IP address of the router A1 present in the measurement target section. The values '2' and '3' are given in the 'TTL' of the pre-marker packets P4 and P5 which follows the pre-marker packet P3 to be transmitted from the measurement server 1 to the measurement terminal 2, thus, each value of the 'TTL' becomes 0 in the relaying by the second router B1 and the third router C1. Accordingly, the router B1 and the router C1 return the error packets E4 and E5 in which their IP addresses '10.1.0.2' and '10.2.0.2' are written respectively to the measurement server 1. Thus, the measurement server 1 can obtain the IP addresses of the router B1 and the router C1 that are present in the measurement target section. It is a matter of course that the measurement can be implemented through simulating conditions unique to VoIP by sending the pre-marker packet of the embodiment in the same format as that in the RTP protocol.

As described above, although an IP address of a router on the packet communication network is written also in an error packet in the third embodiment as mentioned above, the probability that someone steals a glance at the packet with the IP address written is lower than in the case in which an IP address is written with the number of relaying and the time of relaying for each test packet use in measuring of communication performance. Therefore, according to the communication performance measurement method of the third embodiment, security can be improved. In addition, according to the third embodiment, a relaying apparatus included in a measurement target section can be designated even if information for identifying the relaying apparatus is unknown in advance, thereby contributing automatic implementation of the measurement method.

Further, although a case in which information for identifying a relaying apparatus included in a measurement target section is unknown in advance has been exemplified in the description above, if the information is known in advance, the pre-marker packet needs not to be sent. In addition, information according to the relaying which information is written in the test packet may be fixedly set to the relaying apparatus included in the packet communication network 100 in advance instead of being designated by the pre-marker packet.

What is claimed is:

1. A communication performance measurement method of measuring communication performance in a communication network including a plurality of relaying apparatuses each relaying a packet representing information, wherein when a relaying apparatus relays a predetermined measurement packet, the relaying apparatus adds information according to each relaying in the relaying apparatus to the predetermined measurement packet to relay the predetermined measurement packet with the information, and wherein the communication performance measurement method comprises:

designating-packet-transferring of transferring, through a transmitting apparatus connected to the communication network, a designating packet to a measurement target section for which a communication performance is measured in the communication network, the designating packet designating a relaying apparatus which adds information to a measurement packet from among the plurality of relaying apparatuses;

measurement-packet-transmitting of transmitting, for the transmitting apparatus connected to one end of the measurement target section, a measurement packet; and measurement-packet-collecting of collecting, for a receiving apparatus connected to the communication network, the measurement packet transferred by the measurement target section from among measurement packets transmitted by the plurality of relaying apparatuses in the measurement-packet-transmitting.

2. The communication performance measurement method according to claim 1, wherein the relaying apparatus adds in advance designated type of information to the measurement packet to relay the measurement packet having the designated type of information, and the designating-packet-transferring designates a relaying apparatus, and transmits, for the transmitting apparatus, a designating packet to the measurement target section, the designating packet designating a type of information the designated relaying apparatus adds.

3. The communication performance measurement method according to claim 1, wherein when the relaying apparatus relays a predetermined identification information written packet, the relaying apparatus adds identification information that identifies the relaying apparatus from other relaying apparatuses to relay the identification information written packet with the identification information, the communication performance measurement method further comprises identification-information-written-packet-communicating of collecting, for the receiving apparatus connected to the communication network, the identification information written packet transferred by the measurement target section, and the designating-packet-transferring transmits, for the transmitting apparatus, a designating packet to the measurement target section, the designating packet designating a relaying apparatus that is identified by the identification information written in the identification information written packet collected in the identification-information-written-packet-communicating.

4. The communication performance measurement method according to claim 1, wherein when the relaying apparatus relays a predetermined type information written packet, the relaying apparatus adds information representing a type of the relaying apparatus to the type information written packet to relay the type information written packet having the type information, the communication performance measurement method further includes type-information-written-packet-communicating of collecting, for the receiving apparatus connected to the communication network, the type information written packet transferred by the measurement target section, and the designating-packet-transferring transmits, for the transmitting apparatus, a designating packet to the measurement target section, the designating packet that designates a relaying apparatus having a type indicated by the type information written in the type information written packet collected in the type-information-written-packet-communicating.

5. The communication performance measurement method according to claim 1, wherein when the relaying apparatus relays a predetermined dummy packet in which an integer is written in advance, the relaying apparatus rewrites an integer written in a predetermined dummy packet into an integer that is 1 subtracted from the integer, and if the rewritten integer becomes 0, the relaying apparatus returns a return packet to an origin of the dummy packet, the return packet in which an identification information is written, the identification information identifying the relaying apparatus from other relaying apparatuses, the communication performance measurement method further comprises returning-packet-collecting of transmitting, for the transmitting apparatus connected to the communication network, in order a plurality of dummy packets in each of which one of a plurality of integers is written, and of collecting, for the receiving apparatus connected to the communication network, the return packet, the plurality of integers being different from each other, and the designating-packet-transferring transmits, for the transmitting apparatus, a designating packet to the measurement target section, the designating packet designating a relaying apparatus that is identified by identification information written in the return-packet-collecting.

* * * * *